United States Patent
Bahlas et al.

(10) Patent No.: US 12,311,479 B2
(45) Date of Patent: May 27, 2025

(54) WELD ROOT GAP MANAGEMENT APPARATUS

(71) Applicant: SAUDI ARABIAN OIL COMPANY, Dhahran (SA)

(72) Inventors: Abdullah Bahlas, Khobar (SA); Dakhel Al-Dakhil, Dammam (SA); Joao Tavares, Dhahran (SA); Khaled Faleh AlFaleh, Dammam (SA); Nader Marzuq Alanazi, Riyadh (SA); Fahad Abdullah Al Harthi, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 66 days.

(21) Appl. No.: 18/191,120

(22) Filed: Mar. 28, 2023

(65) Prior Publication Data

US 2024/0326181 A1   Oct. 3, 2024

(51) Int. Cl.
 *B23K 37/00* (2025.01)
 *B23K 37/0536* (2025.01)

(52) U.S. Cl.
 CPC .............. *B23K 37/0536* (2013.01)

(58) Field of Classification Search
 CPC .......................... B23K 37/053–0538
 USPC ..................... 228/44.5, 49.1, 49.3
 See application file for complete search history.

(56) References Cited

U.S. PATENT DOCUMENTS

| | | | | | |
|---|---|---|---|---|---|
| 2,407,083 | A | * | 9/1946 | Koppel | B23K 37/053 |
| | | | | | 279/74 |
| 2,821,946 | A | * | 2/1958 | Goekler | F16L 1/10 |
| | | | | | 228/44.5 |
| 3,016,856 | A | * | 1/1962 | Cummings | B23K 37/0531 |
| | | | | | 269/34 |
| 3,362,603 | A | * | 1/1968 | Bauer | B23K 37/0531 |
| | | | | | 228/5.1 |
| 3,461,264 | A | * | 8/1969 | Sims | B23K 9/0284 |
| | | | | | 219/60 R |
| 3,462,059 | A | * | 8/1969 | Bell | B23K 37/0531 |
| | | | | | 228/5.1 |
| 3,498,518 | A | * | 3/1970 | Price | B23K 37/0531 |
| | | | | | 228/40 |
| 3,570,109 | A | * | 3/1971 | Harlan et al. | B23K 37/0531 |
| | | | | | 228/221 |

(Continued)

FOREIGN PATENT DOCUMENTS

| | | | | |
|---|---|---|---|---|
| CN | 104246113 A | * | 12/2014 | ......... B23K 37/0533 |
| CN | 111791014 A | * | 10/2020 | |

(Continued)

OTHER PUBLICATIONS

LANL, "Section WFP 2-01—Welding Fabrication Procedure, Attachment 3, ASME B31.8, Gas Transmission & Distribution Piping Alignment and Acceptance Criteria," Engineering Standards Manual ISD 341-2; Chapter 13, Welding & Joining; 2006 (8 pages).

*Primary Examiner* — Kiley S Stoner
(74) *Attorney, Agent, or Firm* — Osha Bergman Watanabe & Burton LLP

(57) ABSTRACT

A weld root gap management apparatus includes three or more spacers with a predetermined dimension; a cam; a shaft that is connected to and supports the cam; and a body of the apparatus. The spacers are movably installed on the body. The shaft is rotatably supported by the body. The rotation of the shaft can make the cam rotate to push the spacers emerge out of the body.

9 Claims, 2 Drawing Sheets

(56) References Cited

U.S. PATENT DOCUMENTS

| | | | | |
|---|---|---|---|---|
| 3,699,635 | A | * | 10/1972 | Bradley ............. B23K 37/0531 29/272 |
| 3,741,457 | A | * | 6/1973 | Gwin ................ B23K 37/0531 228/44.5 |
| 3,765,665 | A | * | 10/1973 | Work .................. B23Q 9/0021 228/44.5 |
| 4,159,072 | A | * | 6/1979 | Lajoie ............... B23K 37/0531 269/49 |
| 4,496,093 | A | * | 1/1985 | Taylor, Jr. .......... B23K 37/0531 228/44.5 |
| 4,741,473 | A | * | 5/1988 | Bennett .............. B23B 31/4066 269/48.1 |
| 5,538,173 | A | * | 7/1996 | Hummel ............ B23K 37/0531 228/44.5 |
| 5,816,475 | A | * | 10/1998 | Brookhouse ....... B23K 37/0531 269/48.1 |
| 2007/0256288 | A1 | * | 11/2007 | Vermaat ............ B23K 37/0533 228/44.5 |

FOREIGN PATENT DOCUMENTS

| | | | | | |
|---|---|---|---|---|---|
| CN | 116713689 | A | * | 9/2023 | |
| CN | 117260157 | A | * | 12/2023 | |
| EP | 0236941 | A2 | * | 9/1987 | |
| EP | 2561949 | A1 | * | 2/2013 | ........... B23K 20/122 |
| GB | 1435004 | A | * | 5/1976 | ........ B23K 37/0531 |
| JP | 61126996 | | | 6/1986 | |
| KR | 2019129624 | A | * | 11/2019 | ........ B05B 13/0207 |
| KR | 20190129624 | A | * | 11/2019 | |
| WO | WO-0024546 | A1 | * | 5/2000 | ......... B23K 37/0531 |

\* cited by examiner

WELD ROOT GAP MANAGEMENT APPARATUS

BACKGROUND

Welding is a fabrication process that combines two materials together by adding heat and pressure. It is done by fusion of a filler (or consumable) material between both base materials. Although welding is a common process in all oil and gas operations, it is still facing many difficulties. A poor weld has to be cut while using clamps to hold the assembly and then the weld will be cut using a grinder. A poor weld can occur when the dimensions between both materials are not accurate, and it also can happen if both base metals are not aligned.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a weld root gap management apparatus comprising: three or more spacers with a predetermined dimension; a cam; a shaft which is connected to and supports the cam; and a body of the apparatus, wherein the spacers are movably installed on the body, wherein the shaft is rotatably supported by the body, wherein and the rotation of the shaft can make the cam rotate to push the spacers emerge out of the body.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-4, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a circuit breaker" includes reference to one or more of such circuit breakers.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although multiple dependent claims are not introduced, it would be apparent to one of ordinary skill that the subject matter of the dependent claims of one or more embodiments may be combined with other dependent claims.

Figure 1:
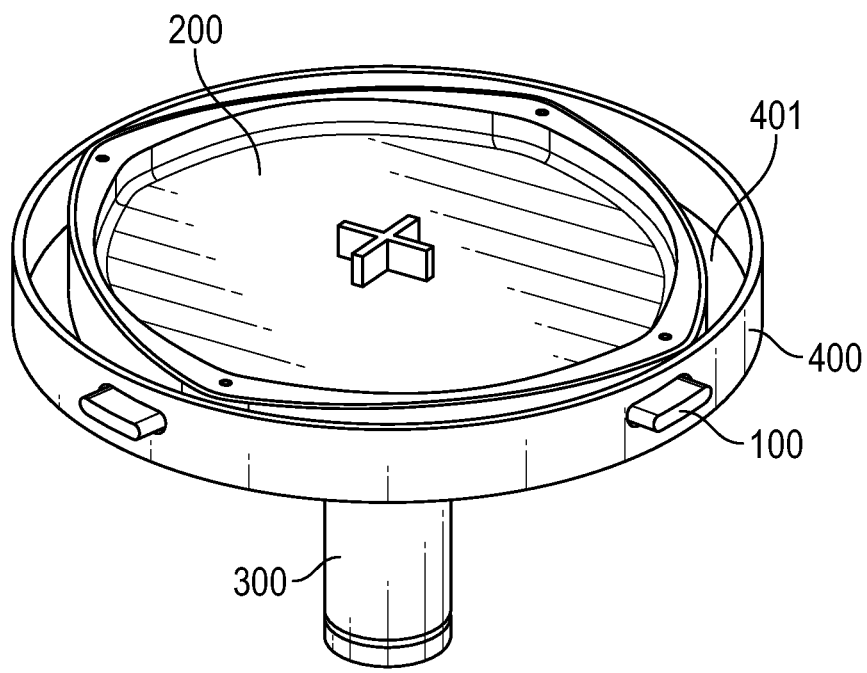
FIG. 1 shows a schematic diagram illustrating a weld root gap management apparatus according to an embodiment of this invention.

FIG. 1 shows a schematic diagram illustrating a weld root gap management apparatus according to an embodiment of this invention. As shown in FIG. 1, the apparatus 10 includes four spacers 100, each with a predetermined dimension (including the thickness), a cam 200, a shaft 300, and a body 400 of the apparatus. This dimension can be specified by a procedure qualification. The procedure qualification which can obtain records on mockup samples is commonly carried out prior to actual field fabrication work.

The body 400 includes an installation part 401, which carries the spacers 100 and is arranged around the cam 200, and a connection part 402, which is connected with the shaft 300. The installation part 401 may be elliptical in shape. The four spacers are set to correspond to the vertices of the major axis and the minor axis of the ellipse. That is, two of the spacers are located on the extension line of the major axis and other two spacers are located on the extension line of the minor axis.

The installation part 401 may have a raised outer periphery (edge). The outer periphery of the installation part 401 has four opens corresponding to the four spacers. According to one or more embodiments, the connection part 402 may substantially have a shape of a gyroscope or a cone, and the connection part 402 may include stiffeners. Upper side surface of the connection part 402 carries the installation part 401. The shaft 300 goes though the center of lower side surface of the connection part 402 and is rotatably supported by the connection part 402. The shaft 300 connects to and supports the cam 20. The rotation of the shaft 300 can make the cam rotate.

Figure 2:
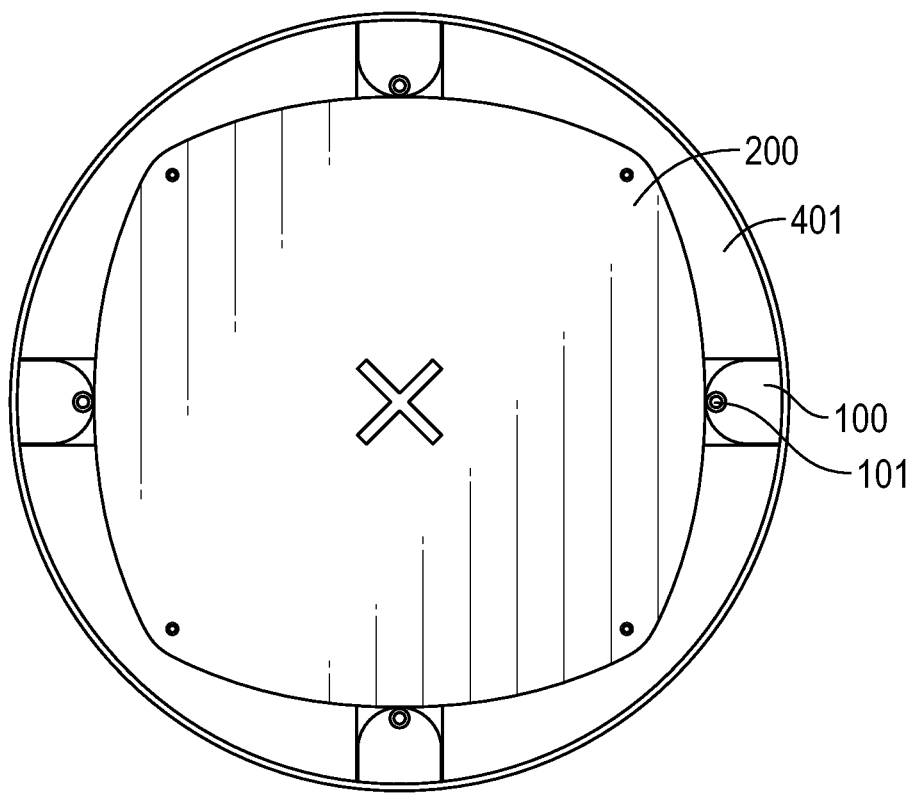
FIG. 2 shows a schematic diagram illustrating spacers in an in-state.

Each of the spacers 100 have an out-state and an in-state. FIG. 2 shows a schematic diagram illustrating the spacer 100 in an in-state according to one or more embodiments of the invention, and FIG. 3 shows a schematic diagram illustrating the spacer 100 in an out-state according to one or more embodiments of the invention.

Figure 3:
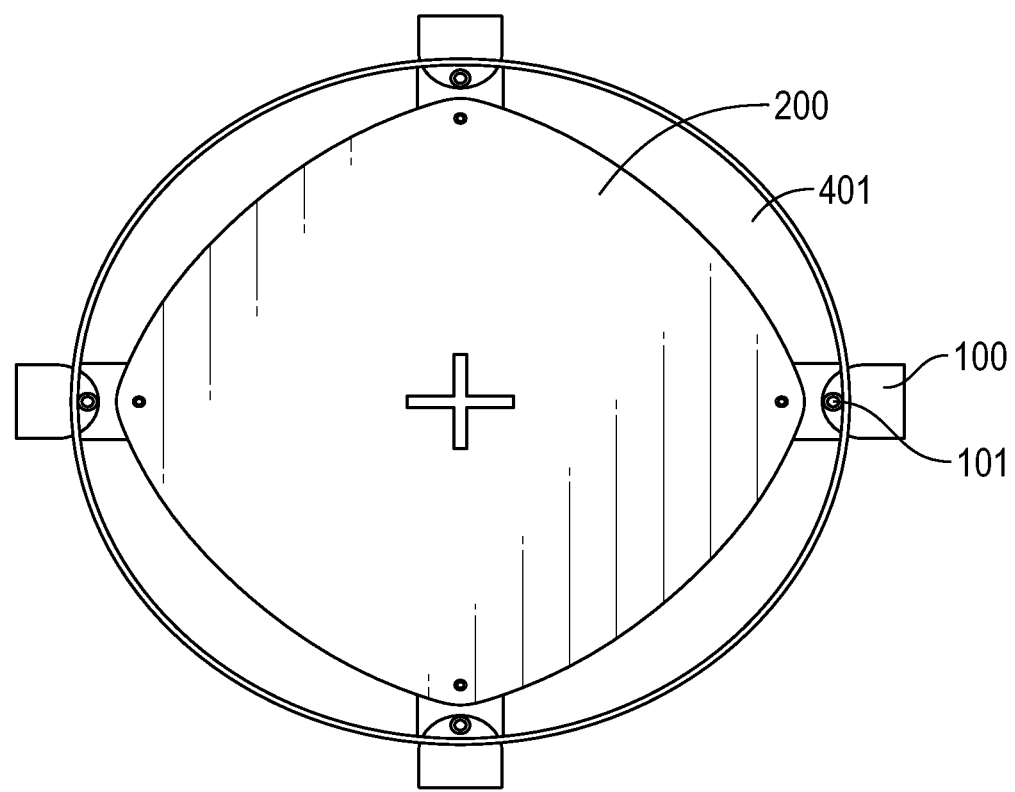
FIG. 3 shows a schematic diagram illustrating the spacer in an out-state.

As shown in FIG. 2 and FIG. 3, when in the in-state, the spacers 100 is within the range of the outer periphery of the body 400, and in the out-state, the spacers 100 extend out from the outer periphery of the body 400. With the rotation of cam 200, the spacers 100 can be pushed to extend out through the opens such that each of the spacers 100 may change from the in-state to the out-state.

According to one or more embodiments, the cam 200 is substantially rounded rectangle in shape having four rounded side and four round vertices. "Rounded side" means that the side has a certain radian. When the spacers 100 are in the in-state, the rounded sides of the rounded rectangle contact the spacers 100. The cam 200 can rotate 45 degrees related to the installation part 401 such that the four rounded vertices of the cam 200 would contact the corresponding spacers 100. By this process, the four spacers 100 are pushed to extend out from the outer periphery of the body 400. After welding, the spacers 100 are retracted to the in-state in order to remove the device.

Each of the spacer 100 has a limiter 101. When the spacer 100 is pushed and moved a certain distance, the limiter 101 may contact with the outer periphery of the body 400 and the spacers 100 cannot be further moved. That is, the limiter 101 can prevent the spacers 100 dropping from the installation part 401 of the body 400. According to one or more embodiments, the limiter 101 can be a bulge formed on the spacer 100. According to one or more embodiments, each of the spacers 100 may have a slide and the installation part 401 may have corresponding tracks.

Figure 4:
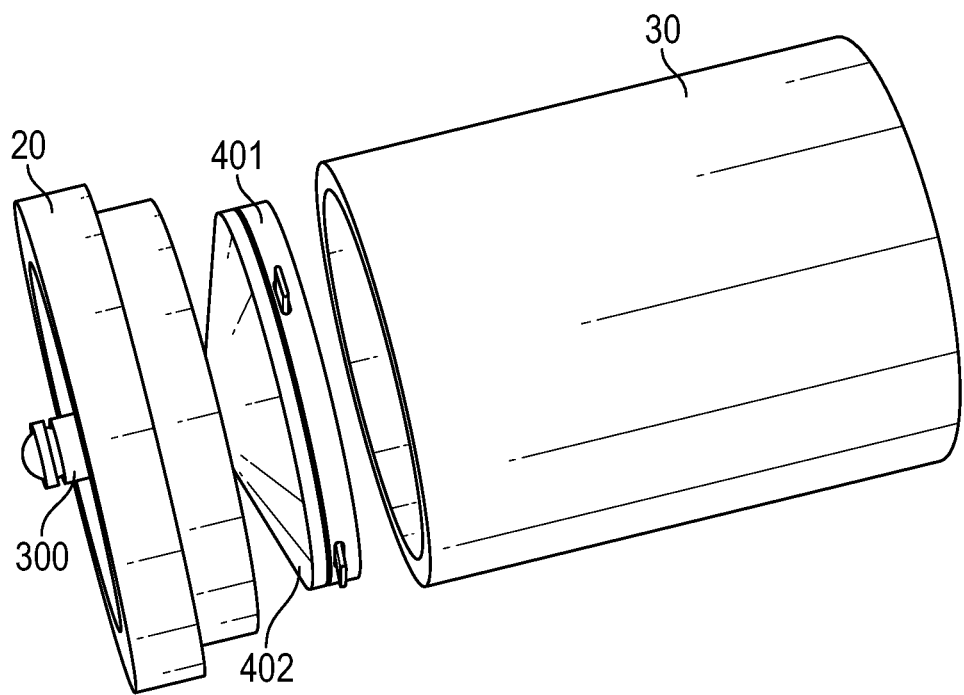
FIG. 4 shows a schematic diagram illustrating the connection of a flange and a pipe by using the weld root gap management apparatus.

FIG. 4 shows a schematic diagram illustrating the connection of a flange 20 and a pipe 30 by using the apparatus 10. As shown in FIG. 4, before welding, the apparatus 10 may be held by hand of a user and inserted from the flange side. Specifically, the shaft 300 is inserted into the flange 20 from one side and extends from the other side. After the apparatus 10 is inserted, the shaft 300 can be rotated, for example, manually to extend the spacers 100. When the spacers are extended, the pipe 30 can rest on the spacers 100 such that the only space between the flange and pipe is the thickness of the spacers 100. Then, after the welding is done, the apparatus 10 can be removed from the flange side.

The device may be taken out manually after the welding is done and the spacers are retracted. Because the spacers are retracted, the device can be easily removed from the flange side. In one or more embodiments, the spacers are made of a material that will not melt during the welding process. In some embodiments, to help facilitate this, the device is inserted in the flange side, then the shaft is rotated to extend the spacers 100, which each emerge 90 degrees apart from each other. Then, the welding may be performed at four points that are at 45 degrees between respective spacers 100. Finally, the shaft can be rotated again such that the spacers are retracted, and the welded device may be removed from the flange side.

Though there are four spacers 100 shown, those skilled in the art would readily understand that there can be any number of spacers 100, and the cam 200 would be shaped accordingly to make sure each of the spacers can be pushed and extended from the outside edge of the body 400.

Each of the components of the apparatus 10 can be manufactured using a 3D-printer. In one or more embodiments, all parts can be printed in polyethylene terephthalate glycol (PETG).

One or more embodiments of this invention can ensure a consistent welding space of a predetermined dimension all around the pipe during the production construction work and joining pipe to flange. The root opening space limit is determined by the thickness of spacer which is based on the procedure qualification record on a mockup sample.

One or more embodiments of this invention will ensure a perfect alignment between them. Thus, eliminating any misalignment issues. One or more embodiments of this invention will help reducing the time for weld joint fit-up, controlling and managing the pipe to flange Hi-Lo and root opening which will eventually ensure higher quality welds and resolve the complexity of the field joint coating application, which is regularly associated with excessive weld root protrusion.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A weld root gap management apparatus comprising:
   three or more spacers with a predetermined dimension;
   a cam;
   a shaft that is connected to and supports the cam; and
   a body of the apparatus,
   wherein the spacers are movably installed on the body,
   wherein the shaft is rotatably supported by the body,
   wherein the rotation of the shaft is configured to rotate the cam and push the spacers out of the body, and
   wherein the shaft is inserted into a flange for connecting a connection part to a pipe.

2. The apparatus according to claim 1, wherein the body comprises an installation part arranged around the cam and configured to carry the spacers, and a connection part coupled to the installation part via the shaft.

3. The apparatus according to claim 2, wherein the apparatus comprises four spacers, the installation part comprises an elliptical shape, and the four spacers are set to correspond to the vertices of major axis and minor axis of the ellipse.

4. The apparatus according to claim 2, wherein the installation part has a raised outer periphery which has four openings corresponding to the four spacers.

5. The apparatus according to claim 2, wherein the connection part is in a cone shape.

6. The apparatus according to claim 3, wherein the cam comprises a round rectangle shape comprising four rounded sides and four rounded vertices.

7. The apparatus according to claim 6, wherein the spacers have an in-state and an out-state, wherein the in-state comprises contact between the round sides and the spacers, the spacers being within the body, and wherein the out-state comprises contact between the rounded vertices of the rounded rectangle and the spacers, the spacers extending out of the body.

8. The apparatus according to claim 7, wherein the cam is configured to rotate 45 degrees in relation to the installation part such that the four rounded vertices of the cam contact and push the fourth spacers out of the outer periphery of the installation part.

9. The apparatus according to claim 1, wherein each of the spacers has a limiter configured to prevent the spacers from dropping from the body.

\* \* \* \* \*